(12) United States Patent
Uhl

(10) Patent No.: US 6,924,930 B2
(45) Date of Patent: Aug. 2, 2005

(54) MICROSCOPE ILLUMINATION DEVICE

(75) Inventor: Rainer Uhl, Gräfelfing (DE)

(73) Assignee: Till I.D. GmbH, Gräfelfing (DE)

( * ) Notice: Subject to any disclaimer, the term of this patent is extended or adjusted under 35 U.S.C. 154(b) by 0 days.

(21) Appl. No.: 09/828,978

(22) Filed: Apr. 10, 2001

(65) Prior Publication Data
US 2001/0028497 A1 Oct. 11, 2001

(30) Foreign Application Priority Data
Apr. 10, 2000 (DE) .......................................... 100 17 823

(51) Int. Cl.⁷ .............................................. G02B 21/06
(52) U.S. Cl. .......................... 359/389; 359/388; 356/73
(58) Field of Search ................................ 359/385–387, 359/389, 388, 368; 362/327; 250/458.1, 459.1, 461.1, 461.2; 356/73

(56) References Cited

U.S. PATENT DOCUMENTS

| | | | | |
|---|---|---|---|---|
| 2,944,463 A | * | 7/1960 | Rantsch | 359/386 |
| 3,497,377 A | * | 2/1970 | Allingham | 359/883 |
| 4,297,032 A | * | 10/1981 | Temple | 356/237.1 |
| 4,515,447 A | * | 5/1985 | Weimer et al. | 359/388 |
| 4,640,589 A | * | 2/1987 | Reich | 359/350 |
| 4,758,088 A | * | 7/1988 | Doyle | 356/451 |
| 4,852,985 A | | 8/1989 | Fujihara et al. | |
| 5,038,258 A | | 8/1991 | Koch et al. | |
| 5,751,417 A | | 5/1998 | Uhl | |
| 5,801,881 A | * | 9/1998 | Lanni et al. | 359/368 |
| 5,982,534 A | * | 11/1999 | Pinkel et al. | 359/387 |
| 6,088,097 A | | 7/2000 | Uhl | |
| 6,169,289 B1 | * | 1/2001 | White et al. | 250/458.1 |
| 6,215,549 B1 | * | 4/2001 | Suzuki et al. | 356/338 |
| 6,255,083 B1 | * | 7/2001 | Williams | 435/6 |
| 6,466,316 B2 | | 10/2002 | Modlin et al. | |

FOREIGN PATENT DOCUMENTS

| | | |
|---|---|---|
| DE | 42 28 366 A1 | 3/1994 |
| DE | 196 16 216 A1 | 10/1997 |
| WO | WO 200006991 A2 * | 2/2000 |

* cited by examiner

Primary Examiner—Mark A. Robinson
Assistant Examiner—Lee Fineman
(74) Attorney, Agent, or Firm—Nixon Peabody LLP; David S. Safran

(57) ABSTRACT

A microscope for transmission viewing of a speciment including a light source for producing a light beam; an objective lens positioned for focusing the light beam produced by said light source on an area of the specimen for illuminating said area; and a reflector positioned for reflecting light transmitted through the specimen back through the illuminated area of the specimen.

12 Claims, 3 Drawing Sheets

MICROSCOPE ILLUMINATION DEVICE

BACKGROUND OF THE INVENTION

1. Field of the Invention

The present invention is directed to a microscope illumination device for transmission viewing of an object to be examined, with a light source for producing a light beam, an optical arrangement for focusing the light from the light source via an objective lens on an object to be examined, and a reflector mechanism, which is located on an opposite surface of the object and for reflecting the illuminated light transmitted by the object back onto the specimen.

2. Description of the Prior Art

"Trans-illumination" of specimen in a microscope is usually accomplished through a condenser, which directs the light from a light-source through the specimen onto the objective lens, the latter being positioned on the opposite side of the condenser. In "epi-illumination", on the other hand, which is needed for fluorescence or reflection microscopy, illumination occurs through the objective lens, i.e., is accomplished by the same optics by which the preparation is viewed. Preferably, xenon and mercury short arc lamps are used as the light sources. If the intention is to switch back and forth quickly between incident epi- and trans-illumination, it becomes noticeable that the indicated light sources cannot be turned on and off quickly or their intensity cannot be controlled. For a microscope with automatic control of all functions, for example, by a computer, in the past mechanical closures had to be used and fast intensity control was possible within certain limits only with mercury (Hg) lamps.

Another defect of existing transillumination systems concerns the fact that biological preparations often exhibit very poor contrast. As a result, many high quality transmitted light condensers are equipped for the possibility of contrast-amplifying processes, such as Zernicke phase contrast or Normarksi differential interference contrast. Both processes, however, require not only manipulation of the illumination light, i.e., the beam path in front of the specimen, but also the light after it passed through the specimen. To accomplish this, either special objective-lenses are necessary (phase contrast) or optical elements such as DIC prisms and analyzers must be placed in the beam path. Phase contrast objectives usually limit the choice of objectives and reduce light throughput to some extent, while optical elements such as analyzers requires for DIC reduce light throughput considerably. Consequently, fast switching between optimum, contrast-intensified transmitted light observation and weak-light fluorescence observation is not possible.

U.S. Pat. No. 4,852,985 discloses an illumination device for a microscope, which is made as a flat array of individually triggerable light emitting diodes, which overcomes some of the described problems.

SUMMARY OF THE INVENTION

In view of the foregoing, it is an object of the invention to overcome the aforementioned disadvantages in the prior art and to provide a microscope which enables prompt switching between incident light and transmitted light and delivers high-contrast transmitted light images for the generation of which the light beams behind the specimen need not be influenced. Preferably, illumination will be turned on and off quickly and its intensity can be changed quickly and flexibly.

A second object of the present invention is to provide a microscope illumination device which allows transmission viewing of a specimen and which can be operated as easily and efficiently as possible in a function unit with epi-illumination.

These and other objects are achieved in accordance with the present invention using a microscope with a light source for producing alight beam to be directed to a specimen, an optical arrangement for illuminating an objective lens, which focuses illumination light on an area of the specimen, and a reflector mechanism which is located proximate to an opposing surface of the specimen, the reflector mechanism reflecting the illumination light transmitted by the specimen back onto the illuminated area of the specimen. Such a microscope is advantageous since, in spite of the "incident light geometry" of the illumination light, i.e., the illumination light focused via the microscope onto the specimen side facing the microscope, transmission viewing of the specimen is possible. This is because the illumination light, which is focused by the microscope on the specimen and which is transmitted by the specimen, is reflected back again by the reflector mechanism onto the specimen, passes again through the specimen and can be collected by the microscope for viewing.

The microscope, in accordance with the present invention, can be operated very easily in a function unit with, for example, epifluorescence analysis. The same light source may be used both for trans-illumination and epi-illumination, in particular in case that this light source can be switched rapidly between different wavelengths or wavelength ranges. In general, the invention enables a completely free choice of the wavelength of the illuminating light. A further benefit is that by a corresponding design of the reflector unit, i.e. by providing for a different reflectivity in different areas thereof, an "oblique illumination" of the sample may be obtained in a simple manner, whereby the contrast of the transmission image is advantageously enhanced.

DETAILED DESCRIPTION OF THE PREFERRED EMBODIMENTS

Figure 1:
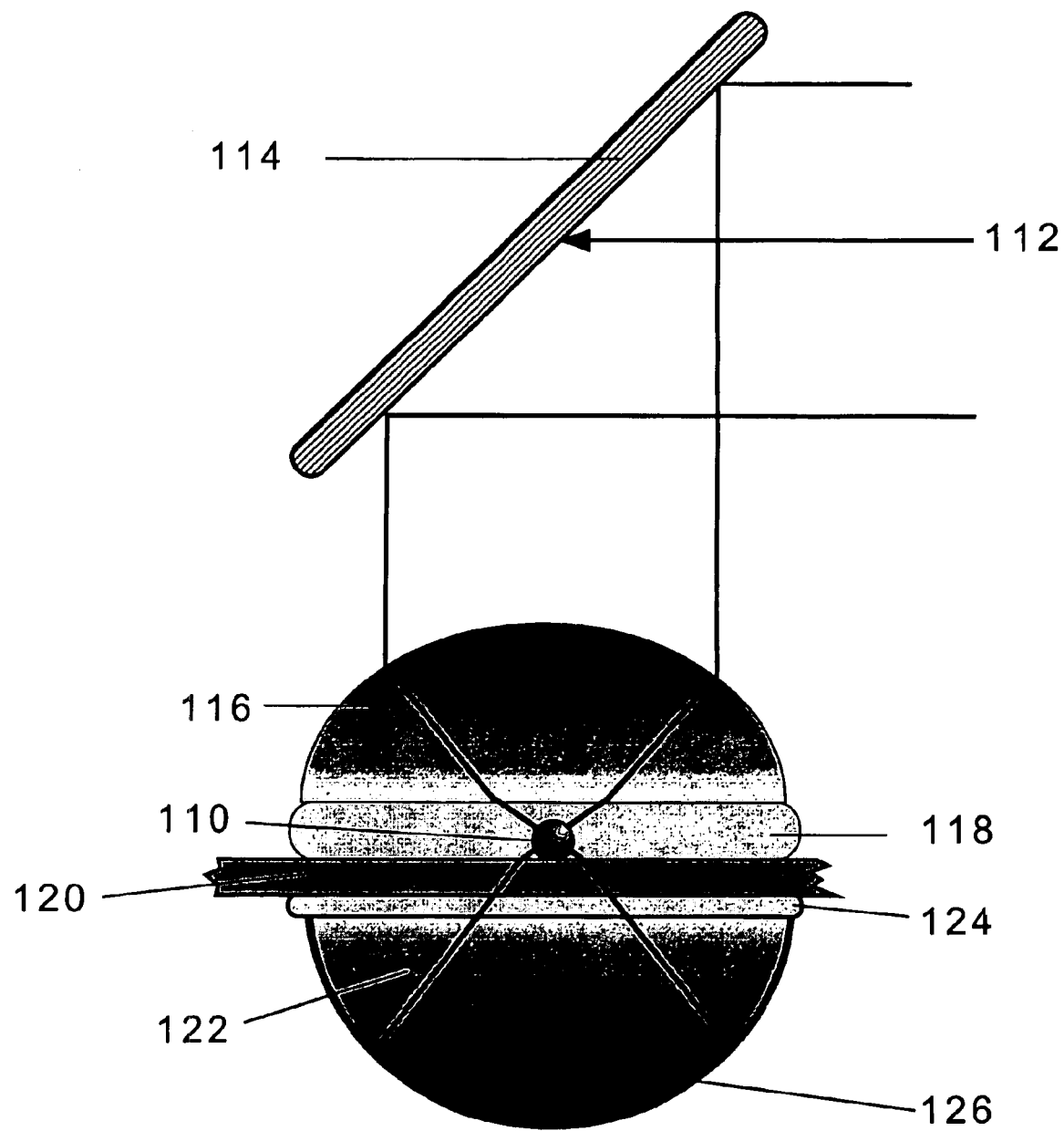
FIG. 1 is a sectional view of a microscope in accordance with a first embodiment of the present invention.

FIG. 1 shows part of a microscope device having a light source (not shown) and which allows viewing of a specimen 110 in transmission, i.e., in transmitted light, or in epi-fluorescence. The microscope device preferably includes a common light source for transmission illumination and epifluorescent illumination, which allows a rapid change between different wavelengths and delivers an excitation or illumination beam 112, which strikes and is deflected by a beam splitter 114 on an entry pupil of the microscope objective lens 116. To excite epi-fluorescence, the beam splitter 114 is dichroic, i.e, the beam splitter 114 reflects the excitation light and transmits the emission light. The generally longer-wavelength light provided for transillumination coincides with the transmission range of the beam splitter 114, but ordinarily enough light is reflected by the beam splitter 114 that sufficiently bright trans-illumination can be accomplished.

To enable the illumination or excitation light to reach the specimen 110, the microscope objective lens 116 is sometimes immersed in an immersion liquid 118, which provides a medium of equal refractive index to extend from the objective lens to the biological specimen 110, which is supported on a holder, such as a slide or cover glass 120. The constellation makes it possible to avoid reflection of the illumination or excitation light before entering the specimen 110. On the side of the specimen 110, opposite the microscope objective lens 116, i.e., underneath the object slide 120, is a reflector means 122, which is formed by a hemispheric transparent body, preferably glass. Preferably disposed between a flat boundary surface and the object slide 120 is a liquid medium 124 used to largely avoid the imaging errors. The liquid medium 124 is preferably water or an immersion oil, however, may be replaced by a gas or air.

The reflector means 122 includes a hemispherical outer boundary surface 126, which is completely reflective, at least in the wavelength range of the illumination light, in a first embodiment in order to reflect back all the illumination light traveling through the specimen 110 onto the area of the specimen illuminated overhead by the microscope objective lens 116. The reflector means 122 acts in this way as replacement for a separate transmitted light source and the corresponding condenser.

The illumination light reflected back by the reflecting surface 126 into the illuminated area of the specimen 110 is collected by the microscope objective lens 116 and is imaged using suitable optics onto the eye of the user or a detector. The wavelength of the light used for the illumination is preferably in the transmission range of the beam splitter 114, so that the largest part of the light transmitted by the specimen 110 and collected by the microscope objective lens 116 is transmitted by the beam splitter 114. At the same time, the beam splitter 114 should act by transmission for the fluorescent light of the specimen 110, which is collected by the microscope objective lens 116. Given the fact that much less light is required for transmitted light illumination than for fluorescence excitation, even the small fraction of light reflected by a dichroic beam splitter 114 in its wavelength-range of maximal transmission is enough to illuminate the preparation with sufficient brightness.

Figure 2:
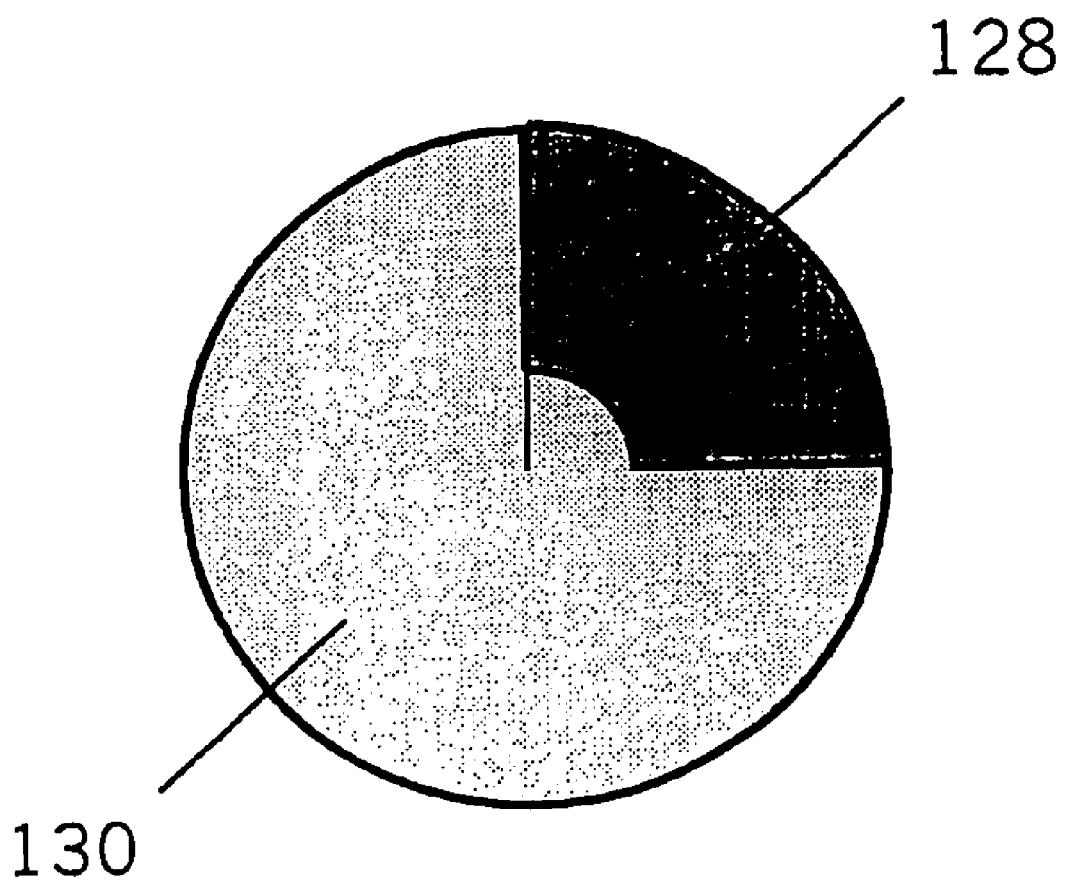
FIG. 2 is a schematic view of an outer side of the reflector shown in FIG. 3.

As shown in FIG. 2, in order to obtain an image with contrast as high as possible during illumination and transmission viewing of the specimen 110, the reflector means 122 can be made such that it does not reflect with uniform intensity over the entire hemisphere of the illumination light, but rather acts as a mirror only in one certain range for the wavelength(s) of the illumination light in order to achieve "oblique illumination" of the specimen 110. In a particular embodiment only less than one quarter 128 of the hemispheric surface 126 is reflective, while the remaining area 130 does not act as a mirror for the wavelengths of the illumination light.

The arrangement shown in FIG. 1 forms an extremely versatile and flexible overall system for combined transmission and epi-fluorescence microscopy. It does not require additional transmission illumination and can be selectively operated as a transmission microscope or as an epi-fluorescence microscope with a single light source by quickly changing the wavelength of the light source between the illumination light and the excitation light. A particularly suitable light source, which can be switched quickly between different wavelengths, is described in the German DE 42 28 366, where white light is guided via a parabolic mirror onto a holographic reflection grating, which is turned by way of a scanner and diffracts light with a spectral composition, which depends on the angle of rotation of the reflection grating, onto the parabolic mirror, from where it is supplied via an optical fiber to the excitation beam path of the microscope. Similar embodiments of a light-source corresponding to DE 42 28 366, but with direct coupling to the microscope without the use of fibers can also be imagined. corresponding to DE 42 28 366, but with direct coupling to the microscope without the use of fiberscan also be imagined.

Instead of being equipped with an immersion objective, the microscope can also be made as an inverse microscope, and it can then be advantageous to immerse the reflector means into the preparation of the specimen.

An arrangement according to FIG. 1 can be used especially advantageously for Two-photon microscopy (TPM) because the reflector surface 126 can be used to increase the collecting efficiency for fluorescence photons. To accomplish this, the surface 126 must be made reflective such that the visible emission light is completely reflected, while the light for the oblique illumination is only partially reflected. An example is shown in FIG. 2, where only a quadrant 128 is made reflective, whereas a large fraction of the surface (130) is transmitting. In this way, the collection efficiency can be increased by a factor of two with a single optical component and at the same time oblique illumination can be accomplished.

Furthermore, it is possible to provide the reflection means 122 on the side facing the top surface of the specimen 110 with a suitable opening whereby the action of a pulsed laser beam focused by the microscope objective lens 116 on the specimen 110 causes particles from the specimen 110 to be propelled outward from the specimen 110 where they are subsequently collected. The particles are cut free or prepared before being flung outward via the highly focused, pulsed laser beam from the sample 110 and then are flung outward from the specimen 110 via a second laser blast in order to be captured by a receiving vessel such as the reflection means 122. In particular, it is possible to specifically control and capture individual cells discharged from the specimen 110. In this embodiment of the invention the reflection means 122 is preferably made as an economical, disposable article, which can be replaced after capturing a cell for a new capture process. Alternatively, in order to capture several different particles or cells from a specimen 110, there can be a series of reflection means 122 formed in an array with several identical or different reflection bodies. The array is displaced inbetween "shots" in such a way that each cut out cell or part thereof ends up in a different vessel, i.e. reflection means.

Figure 3:
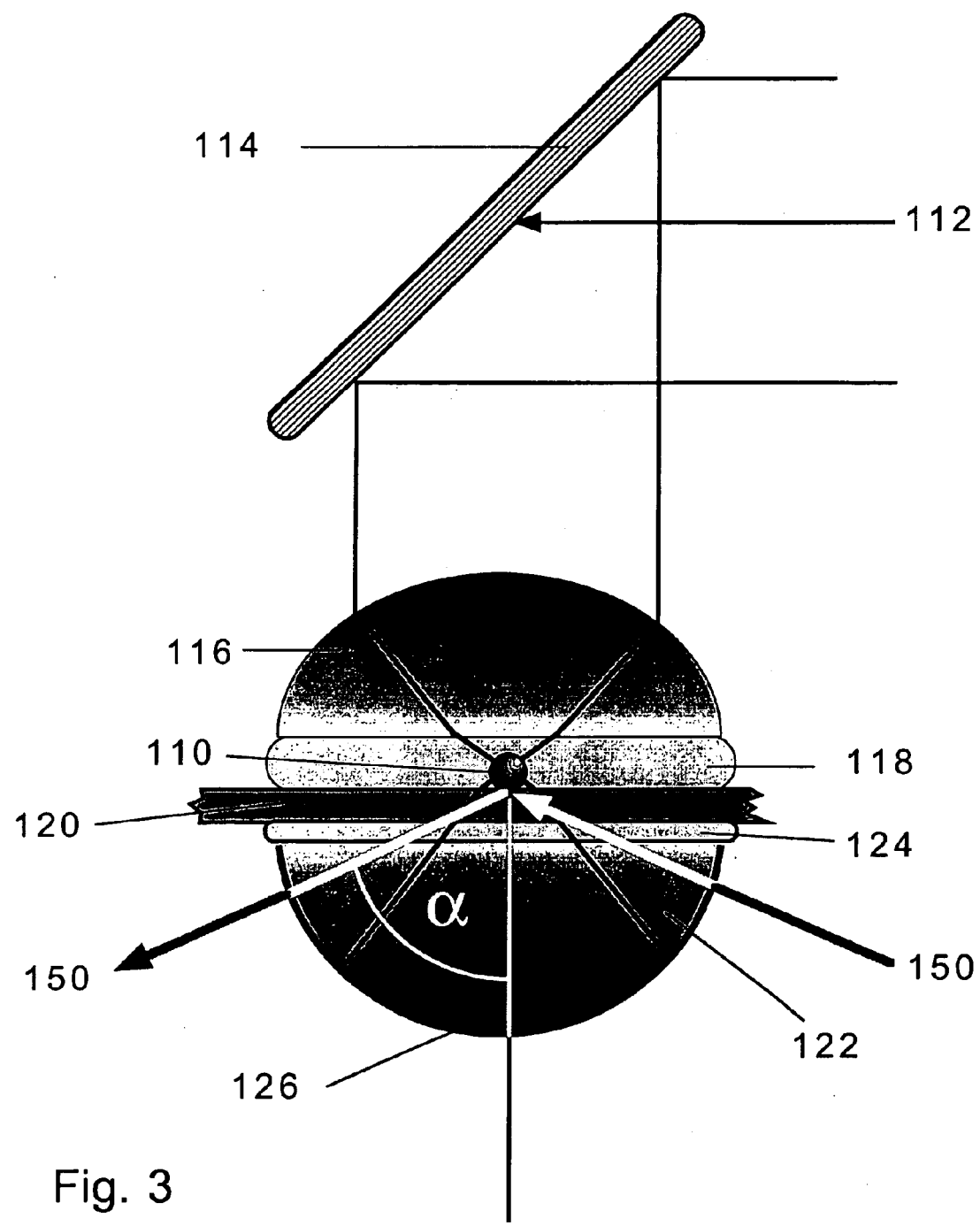
FIG. 3 is a sectional view of a microscope in accordance with a second embodiment of the present invention.

FIG. 3 shows an exemplary embodiment of the invention in which essentially the same optics described in FIG. 2 are used, but in a form optimized for another operating mode, for example, "total internal reflection fluorescence" (TIRF) microscopy. TIRF microscopy is a process in which a laser beam 150 is coupled from the outside into the interior of the reflection means 122 by the nonreflecting area 130 of the reflection surface 126 and is totally reflected on the boundary surface between the object slide 120 and the specimen 110 or the preparation medium 118. In this way, the laser beam 150 illuminates the specimen 110 only by near field action at the total reflection point. Since the angle of incidence of the exciting laser beam 150, and thus, the penetration depth of the laser light into the specimen 110 can be varied, the arrangement can be optimally adapted for special circumstances. The emission light emitted in the part of the specimen 110 illuminated by the laser beam 150 is collected by the microscope objective lens 116 and sent for detection.

What is claimed is:

1. A microscope for transmission viewing of a specimen, said microscope comprising:

a light source for producing a light beam;

an objective lens positioned for focusing the light beam produced by said light source on an area of the specimen for illuminating said area; and a reflector means positioned for reflecting light, which has been focused by the objective lens on the illuminated area and transmitted through the specimen, back through the illuminated area of the specimen; and a dichroic beam splitter for reflecting epi-fluorescence excitation light produced by said light source into said objective lens, wherein said light source is adapted to allow a change between different wavelengths for producing, alternately, transmitted light illumination and epi-fluorescence illumination; and wherein said dichroic beam splitter is essentially impermeable with respect to said excitation light and is essentially, but not completely, permeable with respect to fluorescent light and light for said transmitted light illumination.

2. The microscope device as claimed in claim 1, wherein said reflector means comprises a body having a concave surface which reflects the light beam.

3. The microscope device as claimed in claim 2, wherein said body of said reflector means is hemispherically-shaped.

4. The microscope device as claimed in claim 3, wherein said body of said reflector means is transparent.

5. The microscope device as claimed in claim 2, wherein said concave surface is adapted to reflect essentially all of the illumination light beam.

6. The microscope device as claimed in claim 2, wherein at least a portion of said concave surface is reflective with respect to at least a portion of the illumination light to produce oblique illumination of the specimen.

7. The microscope device as claimed in claim 2, wherein said concave surface is reflective over its entire area with respect to fluorescent light emitted by the specimen.

8. The microscope device as claimed in claim 1, wherein said objective lens is operable to be optically coupled to the specimen via an immersion liquid transmitting the light beam from said light source to the specimen.

9. The microscope device as claimed in claim 1, further comprising a holder for supporting the specimen on a surface of the specimen facing away from said objective lens, said holder being transparent so as riot to reflect the light beam.

10. The microscope device as claimed in claim 9, wherein said body of said reflector means is operable to be optically coupled to the holder via an immersion liquid for transmitting the light beam reflected by said reflector means to the specimen.

11. The microscope device as claimed in claim 1, wherein at least a portion of said reflector means includes a nonreflecting surface for transmitting laser light emitted from outside a boundary surface of said reflector means to a reflecting boundary surface to the surface of the specimen that reflects the laser light from outside the reflector means at an angle such that total reflection of laser light occurs at the boundary surface to the surface of the specimen by which fluorescent excitation of the specimen takes place in a near field area on said boundary surface.

12. The microscope device as claimed in claim 1, wherein said reflector means comprises a body having an aperture for allowing particles flung from the specimen by action of the light beam to be captured by said reflector means.

* * * * *